United States Patent [19]

Hay

[11] Patent Number: 4,720,117

[45] Date of Patent: Jan. 19, 1988

[54] HAND-PEDALLING ATTACHMENT FOR WHEEL-CHAIRS

[76] Inventor: Carl M. Hay, 627 S.E. 53rd Ave., Portland, Oreg. 97215

[21] Appl. No.: 851,722

[22] Filed: Apr. 14, 1986

[51] Int. Cl.$^4$ .................................................. B62M 1/14

[52] U.S. Cl. .............................. 280/250; 280/289 WC; 403/346

[58] Field of Search ............... 280/249, 250, 242 WC, 280/289 WC; 403/13, 14, 346, 186, 389

[56] References Cited

U.S. PATENT DOCUMENTS 3,381,973 5/1968 Carr .............................. 280/242 WC 3,485,510 12/1969 Merlan .............................. 280/250

*Primary Examiner*—John A. Pekar

*Attorney, Agent, or Firm*—Jack E. Day

[57] ABSTRACT

A pedalling attachment for wheelchairs, to form a composite vehicle therewith, which includes an attachment frame with a pedalling mechanism and novel attachment means thereon. The attachment frame has two slidably and rotatably adjustable frames slidably insertable therein, with attachment means located at the ends thereof which grip appropriate portions of the wheelchair side frames. The attachment means are adjustable with respect to each other, to the attachment frame and to the wheelchair frames, so that a wide variety of sizes, configurations and styles of wheelchairs can be accomodated. The pedalling attachment, when attached to the wheelchair, makes the composite vehicle rigid enough to use safely on streets and highways, and to travel at highway speeds thereon for long distances.

8 Claims, 10 Drawing Figures

HAND-PEDALLING ATTACHMENT FOR WHEEL-CHAIRS

GENERAL DESCRIPTION OF THE INVENTION

The present invention is, in general, an attachment for providing motive power for wheel chairs and, in particular, a hand-operated pedalling attachment for host wheelchairs, adjustable to the size of the rider, and to the size and configuration of the host wheelchair, and providing improved stability to the composite vehicle, enabling fulltime wheelchair users to convert their wheelchairs into true handpowered, roadable machines.

BACKGROUND OF THE INVENTION

Some fulltime wheelchair users have long sought ways to move about more rapidly than permitted by the conventional methods of wheelchair propulsion, without sacrificing the utility of the wheelchair in the home, and in places of work and recreation. Particularly, they have sought to escape the present limitation of the wheelchair to the sidewalk for outside use and obtain from it true roadability (as the bicycle is roadable), while retaining its present flexibility indoors and among groups of people.

A number of solutions have been tried, including fitting wheelchairs with motors (electric and internal combustion), and developing hand-powered tricycles and wheelchairs. However, these have not really obtained the performance sought to be gained, since such vehicles are not generally satisfactory for indoor use (except for battery-powered vehicles). Of course, for those whose physical impairment is nearly total, battery-power, with appropriate electrical controls, is probably the only feasible solution, because of its ease of control and quiet operation.

For many persons, however, hand-power attachments for their wheelchairs are the most satisfactory and enjoyable because of the ease of conversion between wheelchair and tricycle configuration, the degree of control they have over the vehicle, and the healthful benefits they derive from its use.

The problems encountered in designing a propulsion attachment for a host wheelchair are several. Since wheelchairs come in several sizes and configurations an attachment for a child's chair would not fit an adult or an adult sized chair. Further, as is well known in the art, wheelchairs seldom have a stabilized horizontal dimension, relying instead upon the user's body to keep the side frames apart, and upon his or her weight to give stability to its structure. This means that a hand-powered attachment, to be truly useful, must fit chairs of various configurations, and changing dimensions at different times, and should provide a stable structure when the device is being used at a higher than normal speed.

Further, the stability of operation of the composite vehicle is dependent not only upon the rigidity of the wheelchair itself, but upon the design of the steering apparatus. A tricycle (which a wheelchair becomes when coupled with a hand-powered attachment) has somewhat different cornering characteristics than a bicycle, even though both may have the same basic design. When a bicycle corners, it "leans" into the corner, that is, it leans toward the direction in which it is turning. It "falls", as it were, toward the rolling surface at the same rate as it turns toward it, enabling it to negotiate the turn safely. A beginning rider soon learns to accomodate to this characteristic.

However, a tricycle, because of its three point suspension, cannot so lean, and an inexperienced rider, when cornering, cannot compensate for the centrifugal forces experienced by leaning inward, but may unconsciously push against the steering gear in an effort to brace himself. If the vehicle is not designed to counteract this tendency, it may be forced into an even tighter turn and upset. Correct design to avoid this hazard requires that all steering forces (which include some of the pedalling forces of hand-powered vehicles) be located forward of the steering axis of the vehicle, as extended upward and downward.

Several solutions exist to the problem of hand-powering wheelchairs. As might he expected, bicycle technology is highly appropriate to some of these solutions.

Carr U.S. Pat. No. 3,381,973 discloses a wheel-chair which can be converted into a cot, and which is hand-powered. The pedalling mechanism is permanently attached to the chair structure, and the wheels shown are clearly intended primarily for indoor use. The pedals are opposed, which may cause steering problems at relatively slow speeds. That is, as one pedal is pushed forward, it tends to turn the vehicle in the direction opposite to the side on which that pedal is located, and pulling the other pedal backward produces the same tendency. When the chair is in a turn, the natural centrifigal forces developed tend to turn the vehicle even more sharply in the same direction, causing steering problems for inexperienced users.

Hudnall U.S. Pat. NO. 3,485,508 discloses a child's bicycle with a pedalling mechanism clearly similar to that of Carr, above. However, it will be seen (FIG. 2) that both pedals are located in the same axial plane, relative to the crank, so that the above-mentioned steering problem is reduced or eliminated.

Merlan U.S. Pat. No. 3,485,510 discloses an attachment for use with a host wheelchair, wherein a pedalling arrangement similar to that of Carr and Hudnall is mounted on a detachable frame which attaches to the front structural members of the wheelchair frame. Merlan removes the castering front wheels from the host wheelchair when the attachment is mounted thereon, possibly presenting conversion problems for the mechanically inept.

Dumont U.S. Pat. No. 4,274,651 discloses a wheelchair in which the main wheels have been replaced by wheels similar to the driving wheels of bicycles. The side frames of the chair have been modified to mount thereon hand-pedalling cranks similar to those of bicycles, with appropriate power transmission means connected with the driving wheels. Each crank has a single pedal attached, and rotating that crank transfers power to the corresponding driving wheel to maneuver the chair as desired. Although Dumont intends his invention to be adapted to modified existing chairs, they are not readily attachable or detachable. Also, adapting this structure for gear-shifting would present mechanical and operational problems.

Bolvin U.S. Pat. No. 4,316,616 discloses a propulsion and steering attachment for existing wheelchairs. Bolvin cannot be adjusted to fit riders of different sizes, or wheelchairs of different sizes and dimensions and configurations, but is limited therein. Also, he does not provide a rigid composite vehicle, as as disclosed by several rotary joints in his attachment.

SUMMARY OF THE INVENTION

The apparatus of the present invention is an improved hand-powered pedalling attachment for wheel-chairs, adjustable for different-sized riders, and providing an improved adjustable attachment means to accomodate different sizes and configurations of host wheelchairs, as well as also providing improved stability of the composite vehicle at high speeds.

The apparatus of the invention includes a novel adjustable attachment means, which permits the pedalling attachment to fit different sizes and configurations of wheelchairs.

The apparatus of the invention also includes a novel lifter means for raising the front wheels of a wheelchair from the rolling surface during an improved procedure for attaching the pedalling attachment, in order to provide a composite vehicle with a rigid tricycle structure with excellent stability for use at high road speeds.

Finally, the design of the pedalling attachment gives greater stability to the composite vehicle when cornering, by providing that all of the pedalling and steering forces are located forward of the steering axis, as extended. This insures that all of the forces exerted by the rider on the steering mechanism (whether intended or not) when the vehicle is cornering, tend to counteract the turning forces, rather than enhancing or intensifying them, providing improved stability of operation.

DETAILED DESCRIPTION OF THE INVENTION

Figure 1:
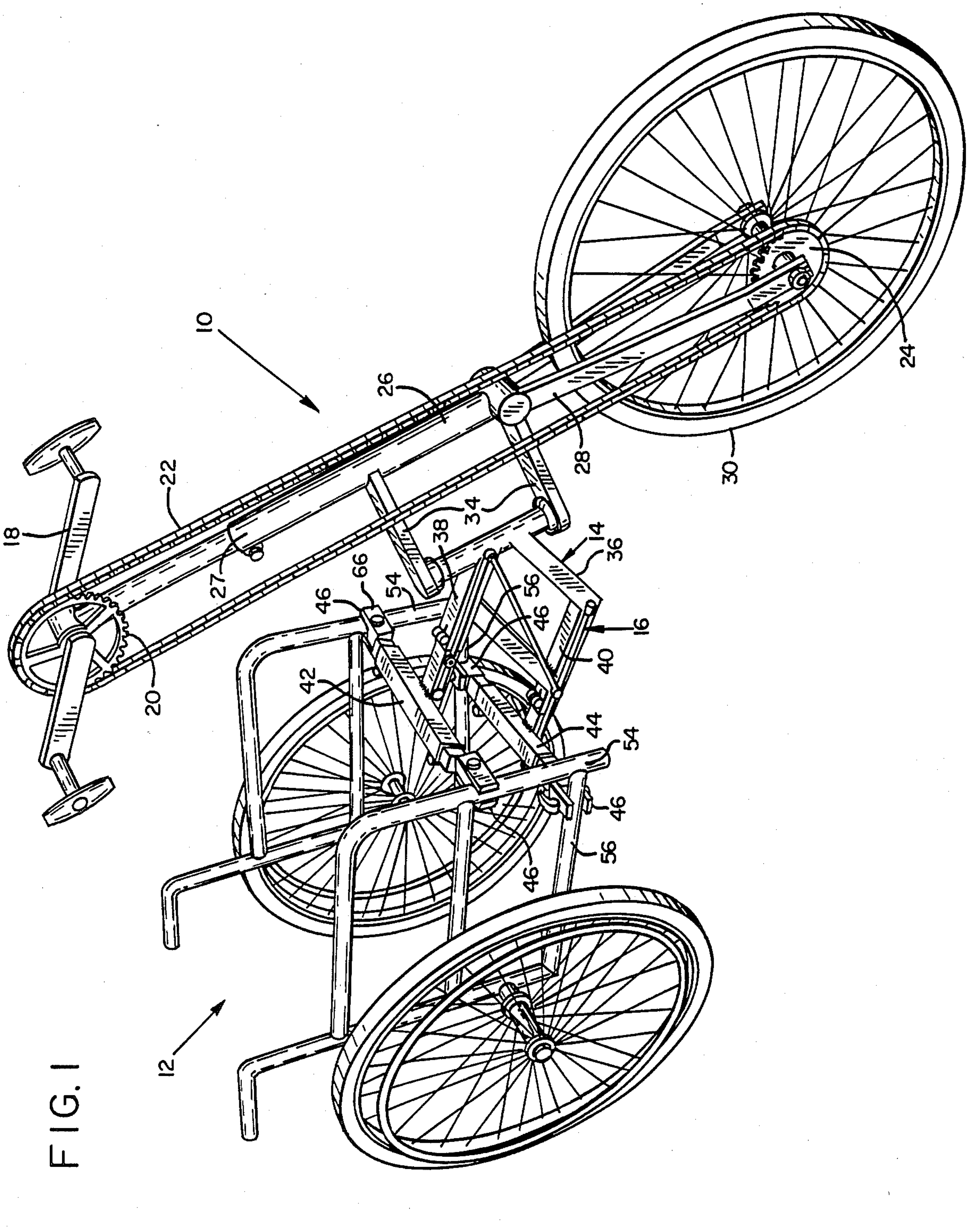
FIG. 1 is a general isometric view of the apparatus of the invention as attached to a wheelchair.

Turning now to FIG. 1, we see a general isometric view of the apparatus 10 of the invention, as attached to a representative wheelchair 12.

Figure 2:
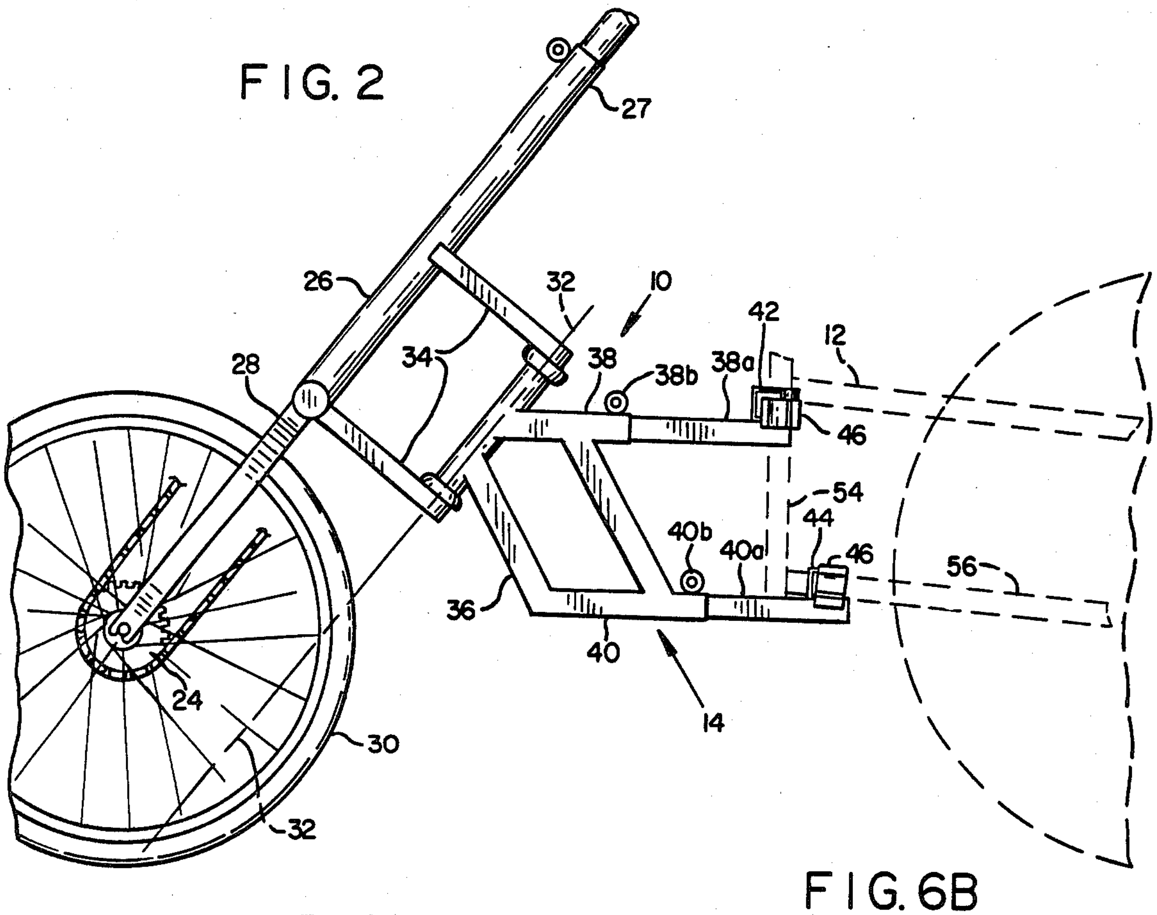
FIG. 2 is a side view of the apparatus of the invention as attached to a wheelchair.
Figure 6A:
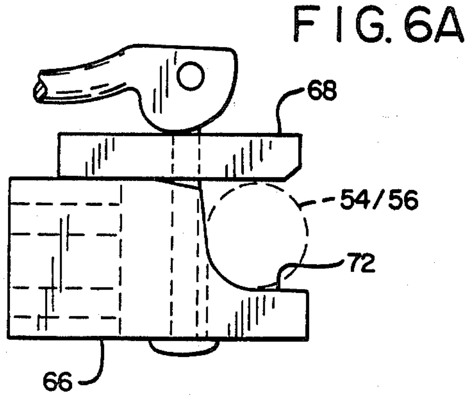
FIG. 6 is a top view of the clampable portion of the attachment means of the invention.
Figure 6B:
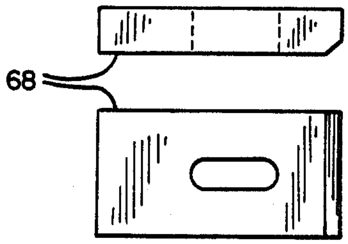

FIG. 2 discloses in more detail the physical relationship between the wheelchair 12 and the appartus of the invention 10. The apparatus 10 is attached to the wheelchair 12 by attachment frame 14, as disclosed in FIGS. 3A and 3B, and especially as disclosed in FIGS. 4A, 4B,5A,5B, and 6, and as discussed in greater detail hereinafter. Attachment frame 14 includes lifter means 16, to assist the user in attaching means 14 to the wheelchair 12, as hereinafter explained in greater detail in connection with FIGS. 3 and 3A.

The apparatus 10 includes hand-propelled power crank 18, driving sprocket 20, chain 22 and driven sprocket 24, all which are mounted on steering column 26, which also includes a slidable longitudinal clamp adjustment 27 for accomodating different sized riders. Fork 28 holds bicycle wheel 30. Steering column 26 is rotatably mounted on apparatus 10 at axis 32 by extensions 34 fixedly attached to column 26.

Figure 3A:
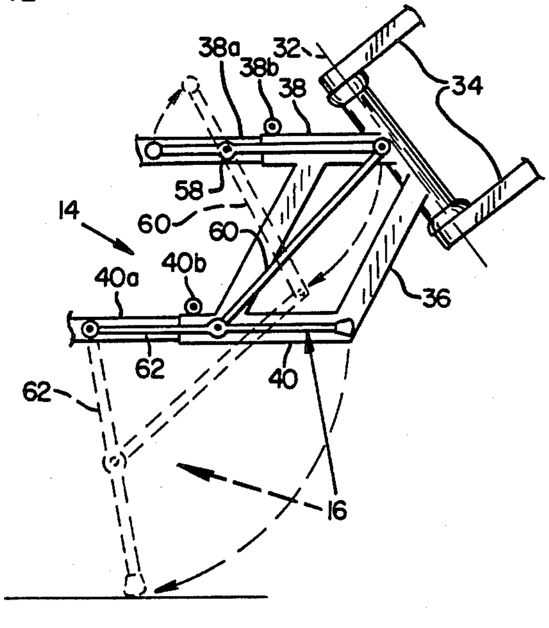
FIG. 3A is a side view of the framework of the apparatus of the invention, disclosing in greater detail the lifting mechanism of the attachment frame.
Figure 3B:
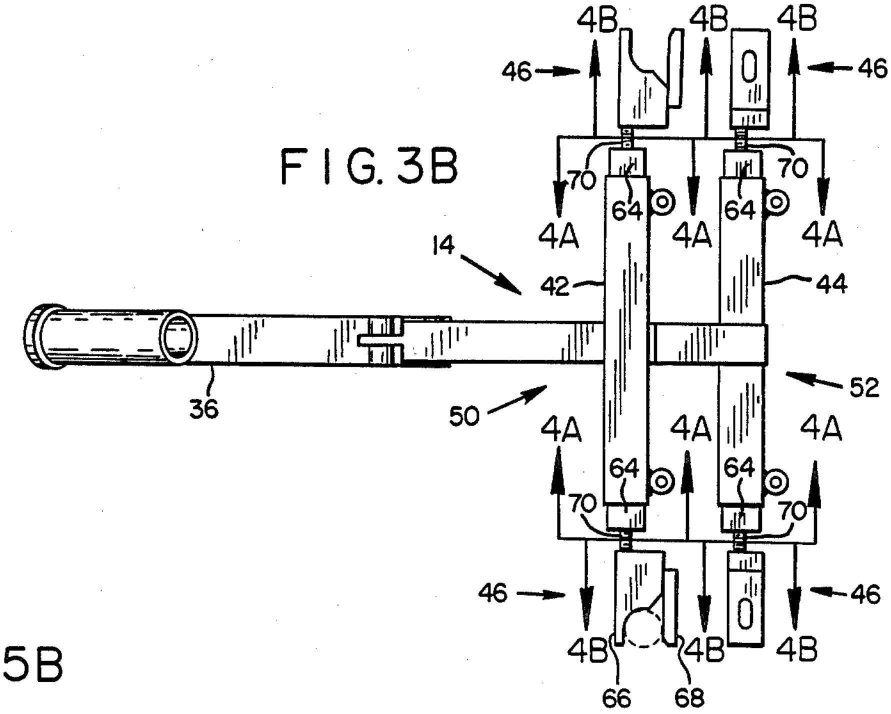
FIG. 3B is a top view of the attachment frame of the apparatus of the invention.
Figure 5B:
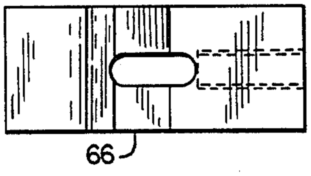
FIG. 5B is a top view of the fixed portion of the attachment means of the invention.
Figure 5A:
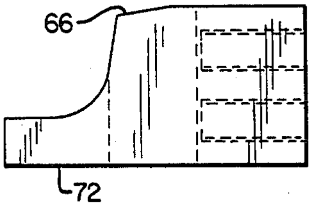
FIG. 5A is a side view of the fixed portion of the attachment means of the invention.
Figure 4B:
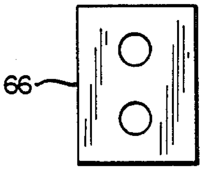
FIG. 4B is an end view of the attachment means of the invention, taken along the arrows "4B—4B" in FIG. 3B.
Figure 4A:
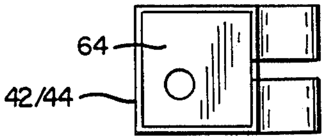
FIG. 4A is an end view of the attachment means of the invention, taken along the arrows "4A—4A" in FIG. 3B.
Figure 5:
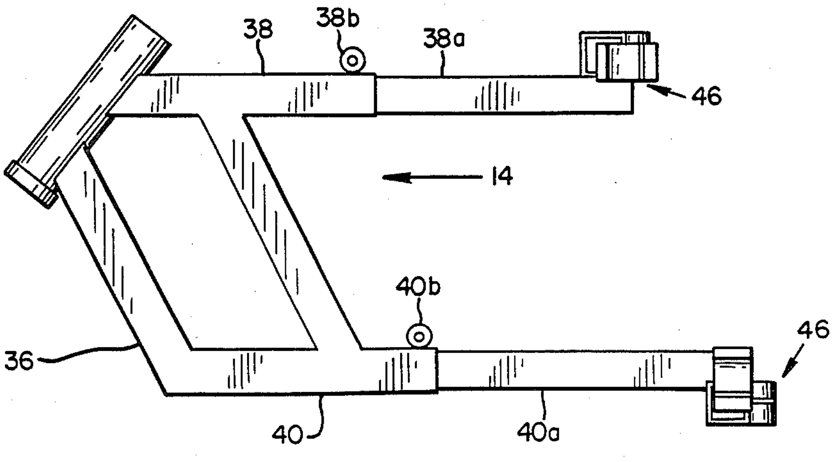
FIG. 5 is a side view of the attachment frame of the invention.

Apparatus 10 further includes framework 36, which is more clearly seen in FIGS. 3A and 5. The distance of steering column 26 from axis 32 and the angle it is mounted with respect to framework 36, insures that the pedalling and steering forces (which appear to the vehicle to be the same, as explained hereinbefore) will be located forward of the steering axis of the vehicle, as extended, giving the vehicle great steering stability when cornering.

Framework 36 also includes upper member 38 and lower member 40, both of which have slidable members **38*a* and 40*a*, respectively, inserted therein. Both members 38*a* and 40*a* are held fixedly in upper member 38 and lower member 40, respectively, by fixing means 38*b* and 40*b***, also respectively, which can be bolts, drop pins, or other fixing means well-known in the art.

Upper member **38*a* has fabricated rigidly thereto cross member 42, and lower member 40*a* has fabricated rigidly thereto cross member 44. Upper member 38*a* and cross member 42, and lower member 40*a* and cross member 44, comprise adjustment frames 50 and 52, respectively. Both cross members 42 and 44 have affixed thereto at each extremity thereof, attachment means 46**, which will be described in greater detail hereinafter in connection with FIGS. 4*a* and 4B, 5A and 5B, and 6. Attachment means 46 is used to removably attach cross members 42 and 44 to upwardly extending member 54 and rearwardly extending member 56 of wheelchair 10 side frames, both respectively, as hereinafter described in greater detail.

Also mounted on framework 36 is lifter means 16, for greater case in attaching apparatus 10 to host wheelchair 12, as hereinafter described in greater detail. Means 16 includes lifter lever 58, connecting link 60, and lifter post 62.

Turning now to FIGS. 4A and 4B,5A and 5B, and 6, we see the details of attachment means 46, which is used for all four points of attachment. Attachment means 46 includes mounting member 64, clamp block 66 and clamp plate 68 of attachment means 46. Clamp plate 68, in clamp position, is held firmly to clamp block 66 by any well-known means such as a bolt or, preferably, a quick-release means such as is well known to those skilled the art. Threaded mounting stud 70, which rotatingly holds clamp block 66 to adjustment frames 50 and 52, is located eccentrically to the axis of cross members 42 and 44, respectively, which may be of any regular cross section, such as a circular or regular polygonal shape. Clamp block 66 has fabricated therein two holes, in either one of which is inserted mounting stud 70, by means of which to fasten clamp block 66 to adjustment frames 50 and 52.

The novel features of the apparatus of the invention are as now to be described.

It will be seen by those skilled in the art that by varying the positions wherein mounting studs 70 are located in frame members 42 and 44, and by rotating clamp block 66 on stud 70, a substantial range of incremental adjustment of attachment means 46 can be obtained in order to adapt the apparatus of the invention to a variety of wheelchair sizes and frame configurations. Further, if one or both of adjustment frames 50 and 52 is rotated, that is, turned by 180 in mounting members 38*a* and 40*a*, respectively, it will be seen that a substantial range of host wheelchair frame sizes and configurations can be accomodated. Attachment means 46 clamp to upwardly extending members 54 and rearwardly extending members 56 by gripping them between clamp block 66 and clamp plate 68, and thereafter tightening some kind of fastener such as a bolt or, preferably, a quick-release device well-known in the art. When these attachments are made, the host wheelchair 12 and pedaling attachment 10 become a rigid composite vehicle—a tricycle—capable of operating at substantial speeds over regular streets and highways as desired. When the vehicle reaches its destination, it can easily be disassembled into its two components and the wheelchair then used in its regular way.

When the apparatus of the invention is to be used with a host wheelchair, threaded mounting stud 70, located in each end of cross members 42 and 44, are adjusted so that clamp blocks 66 engage with upwardly extending members 54 and rearwardly extending members 56 on the side frames of wheelchair 12. This adjustment normally has to be made only once, (the first time that pedalling attachment 10 is adjusted to fit the configuration of a particular user's wheelchair 12). Thereafter, to engage hand-powered pedalling attachment 10 to wheelchair 12, the user sets the brakes on the wheelchair, draws the pedalling attachment 10 towards the chair and inserts first one end and then the other of adjustment frames 50 and 52 behind upwardly extending members 54 of wheelchair 12, at the same time making sure that anvils 72 of clamp blocks 66 are under rearwardly extending members 56 of the side frames of wheelchair 12. The upper ones of attachment means 46 are clamped thereto, and the handle of lifter means 16 is grasped and lifted, which drops lifter post 62 to where it contacts the rolling surface. At this time, the user releases the wheelchair brakes and rolls the chair forward, up onto lifter post 62, until the front wheels are clear of the rolling surface. Concurrently, anvils 72 of clamp blocks 66 will rise and engage the underside of rearwardly extending members 56. At this time, the user tightens all of attachment means 46, releases the brakes, and retracts lifter means 16. The composite vehicle, having been converted into a tricycle, is ready to use.

Because of the construction of steering column 26, that is, because all of the pedalling forces are located forward of the extension of the steering axis, the operation of the composite vehicle is exceptionally stable, especially when cornering.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What I claim as my invention is:

1. A hand-powered pedalling apparatus for attachment to a wheelchair to form a composite vehicle, said apparatus comprising:

- a. an attachment frame incorporating a pedalling mechanism and having:
  - 1. an adjustment frame slidably insertable therein, said adjustment frame including:
    - A. attachment means affixed thereto for securing said apparatus to said wheelchair:
  - 2. said adjustment frame being incrementally rotatable with respect to said attachment frame, and incorporating:
    - A. a hollow tube having a shaped opening in an end thereof, said shaped opening being of a regular configuration about an axis;
  - 3. said attachment means being:
    - A. incrementally adjustable with respect to said attachment frame;
      - I. rotatably about said axis; and
      - II. axially with respect to said end thereof.

2. In the hand-powered pedalling apparatus of claim 1, said attachment means comprising:

- a. clamp means having an extension rotatably attached at a point thereof, said extension shaped to fit rotatably and insertably into said shaped opening in a multiplicity of rotational positions; and
- b. means for fixedly securing said extension in any of said multiplicity of said rotational positions with respect to said shaped opening:
  - 1. said point of attachment of said extension to said clamp means being at a position eccentrically removed from said axis, whereby to obtain said incremental adjustment of said position of said clamp means with respect to said attachment frame, in any of said multiplicity of said rotational positions.

3. In a hand-powered pedalling apparatus for attachment to a wheelchair to form a composite vehicle, said pedalling apparatus incorporating the steering function for said vehicle, wherein said wheelchair has:

- I. side frames having first and second attachment points thereon; and
- II. castering wheels on said side frames contacting a rolling surface when said wheelchair is used separately; and said apparatus has:

- III. an attachment frame having first and second attachment means thereon for securing said apparatus to said wheelchair;

The Improvment Comprising:

- a. lifter means on said attachment frame, including:
  - 1. a lifter lever rotatably attached to said attachment frame;
  - 2. a lifter post rotatably attached to said attachment frame; and
  - 3. a connecting link rotatably connecting said lifter lever to said lifter post; and
- b. said first attachment means is secured first to said first attachment point;
- c. said lifter post is rotated down into contact with said rolling surface when said lifter lever is rotated;
- d. said wheelchair is rolled up onto said lifter post thereby lifting said castering wheels clear of said rolling surface; and
- e. said second attachment means is secured to said second attachment point.

4. In a hand-powered pedalling apparatus for attachment to a wheelchair to form a composite vehicle, wherein said pedalling apparatus incorporates the steering function for said vehicle, wherein said wheelchair has:

- I. side frames having first and second attachment points thereon; and

II. castering wheels on said side frames contacting a rolling surface when said wheelchair is used separately; and said apparatus has:

III. an attachment frame with first and second clamp means thereon for securing said apparatus to said wheelchair, said clamp means being incrementally adjustable thereon, and further including:

A. a hollow tube having a shaped opening in an end thereof, said shaped opening being of a regular configuration about an axis;

B. said clamp having an extension rotatably attached at a point thereof, said extension shaped to fit insertably into said shaped opening in any of a multiplicity of positions; and C. means for fixedly securing said extension in any of said multiplicity of positions with respect to said opening;

The Improvement Comprising:

a. lifter means on said attachment frame, including:

1. lifter lever rotatably attached to said attachment frame;

2. a lifter post rotatably attached to said attachment frame; and 3. a connecting link rotatably connecting said lifter lever to said lifter post; and b. said first attachment means is secured first to said first attachment point;

c. said lifter post is rotated down into contact with said rolling surface when said lifter lever is rotated;

d. said wheelchair is rolled up onto said lifter post thereby lifting said castering wheels clear of said rolling surface;

e. said second attachment means is secured to said second attachment point; and f. said point of attachment of said extension to said clamp being at a position eccentrically removed from said axis;

whereby to obtain said incremental adjustment of said position of said clamp with respect to said attachment frame, in any of said multiplicity of positions.

5. In a hand-powered pedalling apparatus for attachment to a wheelchair to form a composite vehicle, wherein said pedalling apparatus incorporates the steering function for said vehicle, and includes;

I. a steering column having;

A. a driving wheel mounted on a rotating axis at the lower extremity thereof; and B. a rotating hand-propelled power crank mounted at the upper extremity thereof, said power crank being drivingly connected to said driving wheel;

C. said driving wheel having a contact point with a rolling surface;

II. said steering column being rotatingly movable about a steering axis mounted at an obtuse vertical angle with respect to the direction of the forward motion of the composite vehicle; and III. said wheelchair has:

A. side frames having first and second attachment points thereon; and

B. castering wheels on said side frames contacting a rolling surface when said wheelchair is used separately; and IV. said apparatus has:

A. an attachment frame with first and second attachment means thereon for securing said apparatus to said wheelchair;

The Improvement Comprising:

a. lifter means on said attachment frame, including 1. a lifter lever rotatably attached to said attachment frame;

2. a lifter post rotatably attached to said attachment frame; and 3. a connecting link rotatably connecting said lifter lever to said lifter post; and b. said first attachment means is secured first to said first attachment point;

c. said lifter post is rotated down into contact with said rolling surface when said lifter lever is rotated;

d. said wheelchair is rolled up onto said lifter post thereby lifting said castering wheels clear of said rolling surface;

e. said second attachment means is secured to said second attachment point; and f. all of the pedalling and steering forces of said apparatus are located forward of the steering axis.

6. In a hand-powered pedalling apparatus for attachment to a wheelchair to form a composite vehicle, said pedalling apparatus incorporating the steering function for said vehicle, wherein said wheelchair has:

I. side frames having:

A. first and second attachment points thereon; and

B. castering wheels on said side frames contacting a rolling surface when said wheelchair is used separately; and said apparatus has:

II. an attachment frame with first and second attachment means thereon for securing said apparatus to said wheelchair, said attachment frame including:

A. a steering column having:

i. a driving wheel mounted on a rotating axis at the lower extremity thereof;

ii. a rotating hand-propelled power crank mounted at the upper extremity thereof, said power crank being drivingly connected to said driving wheel;

iii. said driving wheel having a contact point with a rolling surface;

B. said steering column being rotatably movable about a steering axis mounted at an obtuse vertical angle with respect to the direction of the forward motion of said composite vehicle:

The Improvement Comprising:

a. lifter means on said attachment frame, including:

1. a lifter lever rotatably attached to said attachment frame;

2. a lifter post rotatably attached to said attachment frame; and 3. a connecting link rotatably connecting said lifter lever to said lifter post; and b. said first attachment means is secured first to said first attachment point;

c. said lifter post is rotated down into contact with said rolling surface when said lifter lever is rotated;

d. said wheelchair is rolled up onto said lifter post thereby lifting said castering wheels clear of said rolling surface;

e. said second attachment means is secured to said second attachment point; and f. all of the pedalling and steering forces of said apparatus are located forward of said steering axis.

7. A handpowered pedalling apparatus for attachment to a wheelchair to form a composite vehicle, wherein:

I. said pedalling apparatus has a steering column having a driving wheel in contact with a rolling surface; and II. said wheelchair has side frames having first and second attachment points thereon, and castering wheels on said side frames contacting said rolling surface when said wheelchair is used separately;

The Improvement Comprising:

a. said apparatus has:

1. an attachment frame including said steering column, and further including first and second attachment means thereon for securing said apparatus to said wheelchair, said attachment frame having:

A. a hollow tube having a shaped opening in an end thereof, said shaped opening being of a regular configuration about an axis;

B. said attachment means having an extension rotatably attached at a point thereof:

I. said extension shaped to fit insertably into said shaped opening in any of a multiplicity of positions; and II. said point of said attachment means of said extension being eccentrically located with respect to said axis;

C. means for fixedly securing said extension in any of said multiplicity of positions with respect to said opening, whereby to obtain said incremental adjustment of said position of said attachment means with respect to said attachment frame, in any of said multiplicity of positions;

2. lifter means on said attachment frame, including:

A. a lifter lever rotatably attached to said attachment frame;

B. a lifter post rotatably attached to said attachment frame; and

C. a connecting link rotatably connecting said lifter lever to said lifter post;

b. whereby to lift said castering wheels from said rolling surface when said pedalling attachment is secured to said wheelchair.

8. The hand-powered pedalling apparatus of claim 9, wherein said attachment frame includes;

a. adjustment frames comprising:

1. slidable members having cross members rigidly fabricated thereto, said slidable members removably insertable into said attachment frame in either of two positions and having;

A. means for fixedly securing said slidable members in said either of said two positions with respect to said attachment frame;

B. said cross members being said hollow tube thereof;

whereby to obtain an increased range of said incremental adjustment of said attachment means to accomodate a wide range of sizes and types of said wheelchairs.

* * * * *

UNITED STATES PATENT AND TRADEMARK OFFICE

CERTIFICATE OF CORRECTION

PATENT NO. : 4,720,117

DATED : 01/19/88

INVENTOR(S) : Carl M. Hay

It is certified that error appears in the above-identified patent and that said Letters Patent is hereby corrected as shown below:

Column 10, line 14, "claim 9," should read --claim 7,--.

Signed and Sealed this

Sixteenth Day of February, 1993

*Attest:*

STEPHEN G. KUNIN

*Attesting Officer*

*Acting Commissioner of Patents and Trademarks*